73-658 SR

12/24/85 OR 4,559,828

United States Patent [19]

Liszka

[11] Patent Number: 4,559,828

[45] Date of Patent: Dec. 24, 1985

[54] SYSTEM FOR OPERATIONAL MONITORING OF A MACHINE

[76] Inventor: Ludwik J. Liszka, Parkvägen 4, 910 36 Sävar, Sweden

[21] Appl. No.: 624,593

[22] Filed: Jun. 26, 1984

[30] Foreign Application Priority Data

Jul. 1, 1983 [SE] Sweden ............................... 8303785

[51] Int. Cl.[4] ...................... G01N 29/00; G08C 19/00

[52] U.S. Cl. ........................................ 73/658; 73/660; 340/870.28

[58] Field of Search ................. 73/587, 593, 658, 659, 73/660; 340/683, 870.28, 870.07

[56] References Cited

U.S. PATENT DOCUMENTS

| | | | |
|---|---|---|---|
| 3,156,910 | 11/1964 | Tarbutton | 340/870.28 |
| 3,758,758 | 9/1973 | Games et al. | 73/583 |
| 3,936,822 | 2/1976 | Hirschberg | 73/658 |
| 4,001,798 | 1/1977 | Robinson | 340/870.28 |
| 4,399,440 | 8/1983 | Douglas | 340/870.07 |

*Primary Examiner*—Stephen A. Kreitman
*Attorney, Agent, or Firm*—Erwin S. Teltscher

[57] ABSTRACT

In a system for monitoring the condition of a machine by vibration analysis, including at least one vibration sensor in operative contact with the machine for sensing machine vibrations, and for providing a vibration signal at its output, a sampling device connected to the output of the vibration sensor for sampling, amplifying and digitizing the signal obtained from the vibration sensor, a frequency analyzer arranged to receive the sampled and digitized signal from the sampling device, and a pattern recognizer coupled to the frequency analyzer for detection of any abnormal frequency spectra, the improvement includes a data processing unit adapted to store control programs, which in turn is connected to the vibration sensor, and includes a microcomputer inclusive of a random access memory, for obtaining vibration data from the sensor, and for storing the vibration data in the form of a time series in the memory, a central monitor remote from the data processing unit adapted to store another program therein, including a computer connected to the frequency analyzer, and providing for monitoring and further processing of the time series, a control unit connected to the monitor, and a communication link connecting the data processing unit and the monitor for periodic transmission of the time series from the memory in the microcomputer to the frequency analyzer, and for transferring the other program from the monitor back to the data processing unit, the control unit also providing for control of the sampling device.

6 Claims, 1 Drawing Figure

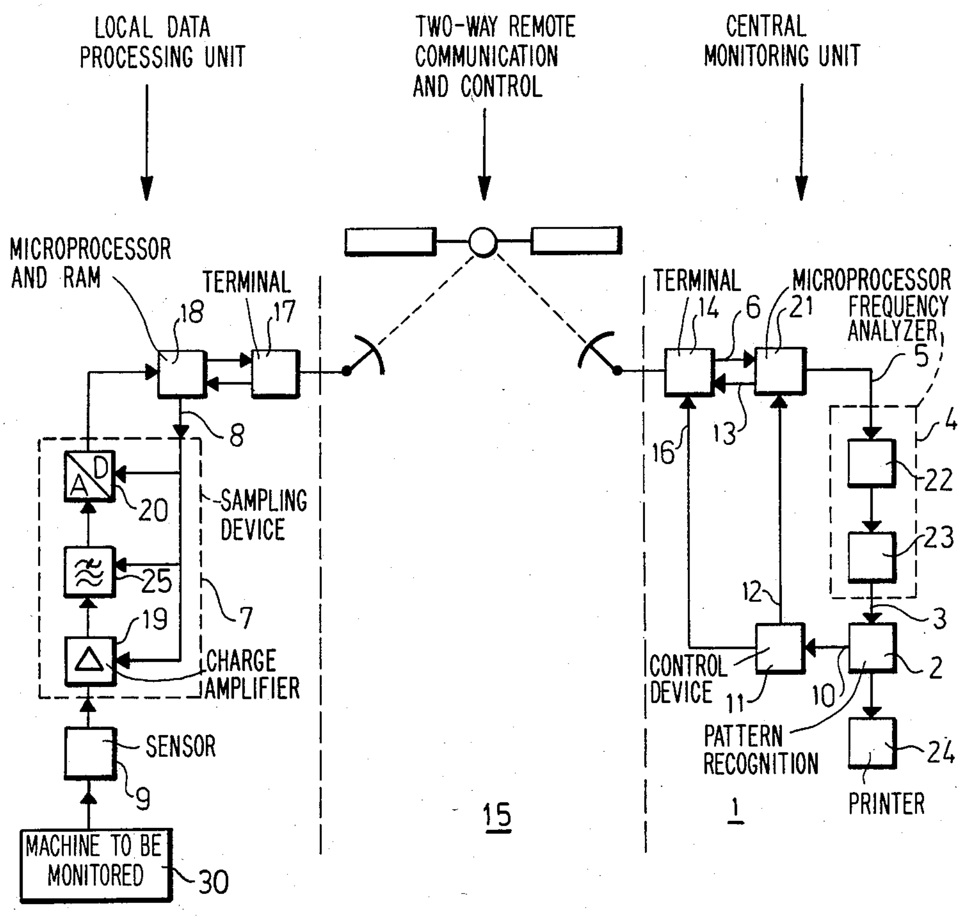
LOCAL DATA
PROCESSING UNIT
TWO-WAY REMOTE
COMMUNICATION
AND CONTROL
CENTRAL
MONITORING UNIT
MICROPROCESSOR
AND RAM
TERMINAL
18
17
8
20
SAMPLING
DEVICE
25
7
19
CHARGE
AMPLIFIER
SENSOR
9
MACHINE TO BE
MONITORED
30
15
TERMINAL
14
6
MICROPROCESSOR
21
FREQUENCY
ANALYZER
5
4
13
16
22
23
12
3
CONTROL
DEVICE
11
10
2
PATTERN
RECOGNITION
24
PRINTER
1

SYSTEM FOR OPERATIONAL MONITORING OF A MACHINE

TECHNICAL FIELD

The present invention relates to a system for operational monitoring of a machine.

PRIOR ART

Known systems for operational monitoring of a machine include a frequency analyzer which is connected to a vibration sensor mounted at the machine and includes pattern recognition means capable of interpreting frequency spectra in relation to previously obtained frequency spectra being representative of normal operational conditions as well as of deviations therefrom. However, the need for qualified personnel being available to handle the frequency analyzer at the machine is a disadvantage which makes the system much too expensive in many applications.

SUMMARY OF THE INVENTION

The invention relates to a system for operational monitoring of a machine, wherein the known system has been improved in such a way that the need for qualified personnel to handle the frequency analyzer at the machine has been eliminated and, therefore, the number of applications can be increased considerably. In the system according to the invention the vibration sensor or sensors, amplifying and digitizing means and a microprocessor with associated memory are combined into a local, initial data processing unit disposed adjacent to the machine for forming and storing vibration data in the form of time series, whereas the frequency analyzer, the pattern recognition means and associated computer equipment are disposed in a central monitoring unit for further processing of the time series, remote communication means being adapted to periodically transfer the time series from the initial data processing unit to the central monitoring unit.

BRIEF DESCRIPTION OF THE DRAWING

The drawing FIGURE shows a block diagram of a preferred embodiment of the system according to the invention.

DETAILED DESCRIPTION OF A PREFERRED EMBODIMENT

In the preferred embodiment of the system according to the invention, a central monitoring unit 1 includes a pattern recognition equipment 2, the input 3 of which is connected to a frequency analyzer 4 having an input 5 connected via a first telecommunication channel 6 to a sampling device 7 provided with a control input 8 and connected to a vibration sensor 9 mounted on a machine (30) to be monitored. An output 10 of the pattern recognition equipment 2 serves to signal when the frequency spectra obtained from the frequency analyzer 4 includes patterns representing deviations from a normal operational condition of the machine. Thus, the output 10 is connected to a control device 11 having an output 12 connected via a second telecommunication channel 13 to the control input 8 of the sampling device 7. Measurement information from the vibration sensor 9 will be transmitted in response to control information transmitted from the control device 11, and a terminal equipment 14 is arranged so as to establish periodically a two-way telecommunication connection 15 including the first and second telecommunication channels 6 and 13.

In the example, the telecommunication connection 15 is a part of the worldwide public telephone net-work and includes a relay station in the form of a geostationary satellite. The terminal equipment 14 consists of a modem and is provided with an automatic dialling input 16 connected to a second output of the control device 11. Via the telecommunication connection 15, the terminal equipment 14 is connected to a corresponding terminal equipment 17 connected to the sampling device 7 and consisting of a modem having auto-reply facilities. Consequently, the monitored machine may belong to a plant which is remotely located (e.g. an oil field), movable (e.g. a ship) and possibly fully automatic (hydroelectric power station). The costs of the components of the inventive system can be kept low as regards the components assembled locally at the plant including the machine to be monitored. It is reasonable to assume that the plant is connected to the public telephone net-work in such a way that the terminal equipment 17 is operative at regular time intervals while being controlled by the control device 11 via the terminal equipment 14 in the central monitoring unit 1.

In the preferred embodiment, the terminal equipment 17 is connected to the sampling device 7 via a communication equipment 18 built around a microprocessor provided with a RAM for programs and data and arranged to be charged with programs via a serial port. The sampling device 7 includes a charge amplifier 19 and an A/D converter 20 serving to connect the vibration sensor 9 to the communication equipment 18. The latter is arranged to adjust the gain of the charge amplifier 19 via the control input 8 of the sampling means 7, and additionally to control the A/D converter 20. For example, the vibration sensor may be supplemented by several vibration sensors each being connected via an associated charge amplifier to a separate analog input of the A/D converter 20 addressed from the communication equipment 18 while being controlled by a program stored in its RAM and obtained from a communication equipment 21 arranged in the central monitoring unit 1 and likewise including a microprocessor. This program generates a time series which is stored in the RAM of the communication equipment 18 and is transmitted after completed sampling to the communication equipment 21 via the telecommunication connection 15. The transmission of the time series may be repeated in case of detected faults, e.g. by using check sums. In addition to programs for sampling, the communication equipment 18 may also receive test programs from the communication equipment 21 for checking the operation of e.g. the charge amplifier 19 and the vibration sensor 9. Before the measuring signal is digitized, it is filtered in an antialising filter, i.a. a low pass filter having a steeply declining response characteristic in the high frequency region. The upper limit frequency can be set from the control monitoring unit 1, depending on the frequency range being currently examined.

In the communication equipment 21 located in the central monitoring unit 1, the microprocessor is provided with programs for further processing of the received time series, i.a. by correcting the measuring values in view of the adjusted gain of the charge amplifier 19, and for conveying the results to the frequency analyzer 4. The latter includes a FFT (Fast Fourier Transform) frequency analyzer 22 having an output connected to a microprocessor 23 provided with a program for processing frequency spectra obtained from a frequency analyzer 22 and forming a table containing levels and frequencies for further processing in the pattern recognition equipment 2.

In the preferred embodiment, the pattern recognition equipment 2 includes a computer provided with the recognition program SIMCA which was originally developed for the processing of chemical spectra of organic substances obtained by means of mass spectroscopes and gas chromatographs (World, S., et al, Proc. of Symposium on Applied Statistics, Copenhagen, Jan. 22, 1981). In the inventive system, this program has been adjusted for the processing of frequency spectra of machine vibrations. In the course of normal operation of the machine a reference class of frequency spectra is generated and is later compared with each subsequent frequency spectrum. Under normal conditions, it is not necessary to interpret the frequency spectra. The program calculates for every new frequency spectrum the probability that this spectrum belongs to a class different from the reference class. Should this probability be high, the deviating components in the frequency spectrum can be shown and a diagnosis of the operating condition be made. The result can be presented by means of a printer 24 connected to the pattern recognition equipment 2.

I claim:

1. In a system adapted for monitoring the condition of a machine by vibration analysis, and wherein the machine has a characteristic frequency spectrum when operating normally, said system including at least one vibration sensor in operative contact with said machine for sensing machine vibrations, and providing a vibration signal at its output, sampling means connected to the output of said vibration sensor, said sampling means including an amplifier, a low pass filter postcoupled to said amplifier, and an A/D converter postcoupled to said filter for sampling, amplifying and digitizing the signal obtained from said vibration sensor, separate frequency analysis means arranged to receive the sampled and digitized signal from said sampling means for frequency analysis thereof, and pattern recognition means coupled to said frequency analysis means for detection of any abnormal frequency spectra corresponding to abnormal machine operation, the improvement comprising local data processing means near said machine adapted to store programs for the control thereof, being connected to said vibration sensor, and including a microcomputer inclusive of a random access memory, being arranged for obtaining vibration data from said sensor, and for storing said vibration data in the form of a time series in said memory, said local data processing means also including said sampling means, central monitoring means remote from said local data processing means adapted to store another program therein, and providing for monitoring and further processing of said time series, said central monitoring means including computer means, as well as said frequency analysis means, and said pattern recognition means, said computer means being connected to said frequency analysis means, control means connected to said central monitoring means, and a two-way communication link connecting said local data processing means and said central monitoring means for periodic transmission of said time series from said memory in said microcomputer of said local data processing means in one direction to said frequency analysis means in said central monitoring means, and for transferring said other program from said central monitoring means back to said local data processing means in a direction opposite to said one direction, said control means providing for control of said amplifier, of said low pass filter, and of said A/D converter, through said communication link, whereby transmission of said time series from said local data processing means to said central monitoring means can be matched to reception conditions prevailing at said central monitoring means.

2. A system as defined in claim 1, wherein said communications means includes a telephone line.

3. A system as defined in claim 1, further comprising additional vibration sensors, and respective charge amplifiers postcoupled to said vibration sensors, each charge amplifier being connected to said A/D converter.

4. A system as defined in claim 1, wherein said communication means include fault detection means for detecting any error in said time series, and means for repeating transmission of said time series in the event of said error being detected by said detection means.

5. A system as defined in claim 1, wherein said communication means include means adapted to transmit test programs for checking the operation of said data processing means.

6. A system as defined in claim 1, wherein said pattern recognition means includes generating means for generating a reference class of frequency spectra during normal operation of said machine, and for calculating for any new frequency spectrum operatively obtained from said machine the probability that said new frequency spectrum belongs to a class different from any frequency spectrum in said reference class, whereby an abnormal machine condition is detected upon said probability exceeding a predetermined limit.

* * * * *